United States Patent Office 3,561,074
Patented Feb. 9, 1971

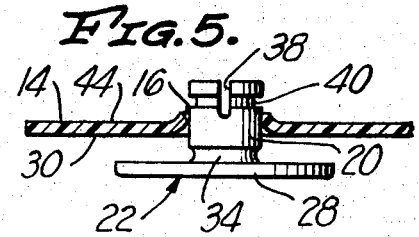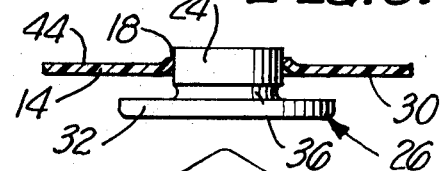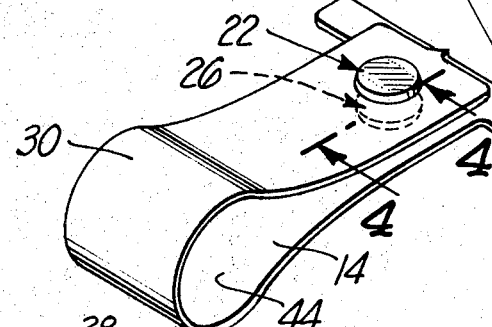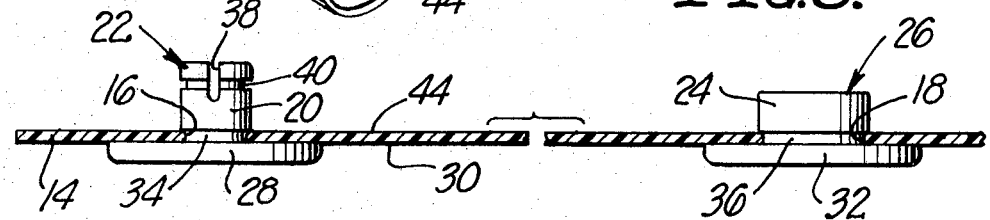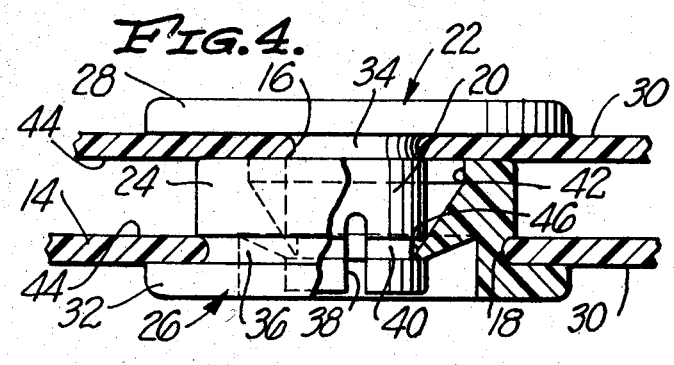

3,561,074
METHOD OF MOUNTING FASTENER COMPONENTS AND CONSTRUCTION THEREOF
Walter W. Mosher, Jr., 738 Fairmount 95101, and Donald A. Long, 936 Uclan Drive 95104, both of Burbank, Calif.
Filed Aug. 16, 1968, Ser. No. 753,153
Int. Cl. A44b 17/00; G09f 3/14
U.S. Cl. 24—208                                     2 Claims

ABSTRACT OF THE DISCLOSURE

Material layer portions of a stretchable plastic material are formed with fastener holes therethrough. Plastic fasteners or fastener components are formed with enlarged heads and reduced shanks with a recess peripherally about each fastener shank adjacent the fastener head. The fastener shanks and the recesses thereof are proportioned relative to the material layer stretchability and the respective fastener holes such that the fastener shanks may be inserted through their respective holes with the stretchable material stretching and permitting such passage. When the material layer portions are positioned aligned with the fastener shank recesses, the material layer portions are received in the recesses with the fastener holes returning substantially to original size so that the material layer portions engage the fastener shanks and retain the fastener in assembly therewith. The material layer portions may be parts of strap-like portions of an identification-type member with the fastener shanks alignable and connectible together to retain the material layer portions adjacent each other.

BACKGROUND OF THE INVENTION

This invention relates to a new and simplified method of mounting fasteners in layers of stretchable material wherein the mere fastener inserting operation accomplishes the entire assembly, the material layers and fasteners co-operating in a unique manner to securely retain said assembly. More particularly, this invention relates to a method and construction of the foregoing characteristics wherein the shanks of shank connectible fasteners are inserted for assembly into determined size holes of the material layers, said fastener shanks being proportioned and having appropriately proportioned recesses formed therein relative to the material layer stretchability such that the material will stretch over the fastener shanks during the insertion and will ultimately return to size from stretching engaged in the fastener shank recesses, thereby retaining the fasteners assembled with the material layers. The present invention, therefore, through the uniquely cooperating fastener and material layer constructions, permits simple and convenient assembly of the fasteners with the material layers without any fastener crimping or deforming operations, heretofore required with the prior constructions for accomplishing the assembly.

Various prior forms of fasteners or fastener components have heretofore been provided, many of which have included special flanging means and the like mechanically engaged during fastener assembly with material layers to retain the fasteners in such assembly until the fasteners are connected together. For instance, in the case of fastening straps of the usual forms of identification bands or identification tag holders, fasteners or fastener components are assembled at spaced locations projecting through the fastening straps, said fasteners being adapted for selective connection thereof by folding over the fastening straps to align said fasteners and forcing the fasteners into snap engagement, in this manner, securely engaging the fastening straps with objects or persons requiring such identification. The flange means of the fasteners serving the assembly retainment has usually taken on the form of cylindrical flanges or spaced tabs which are either forced directly through the fastening straps or through previously formed holes of said fastening straps, after which, these flanges or tabs are mechanically crimped to overlie the fastening strap material and retain the fasteners in assembly.

One of the major difficulties with these prior constructions is occasioned by the fact that in order to provide fasteners with satisfactory and positive fastening action, they have been most usually formed of metals requiring relatively complicated metal stamping dies and the like for fabrication thereof. With the use of metal, and particularly where the fasteners are relatively small and require precise formation thereof in order to reliably perform their fastening function, part tolerances and, therefore, die tolerances are extremely critical, and die wear in high volume production comprises a major problem. Such problems with the prior constructions can be partially solved by the provision of fastener constructions which are less critical from the tolerance standpoint, and can be even more completely solved by providing a fastener construction which may be formed totally from plastic by the usual injection molding processes where die wear is not a problem and fastener reliability is assured.

An additional important factor of required consideration is that although most prior identification-type members, such an identification bands and identification tag holders, have been formed of relatively rigid materials such as leather and its closely related synthetic compositions, with the advent of modern plastics, however, not only may the identification bands and identification tag holders be formed more economically of such plastics, but the same are more pliable and serviceable, markedly improved over the leather and synthetic leather materials. With the flange or tab crimped fastener constructions, however, unless the metal crimping assembly operation is very closely controlled, it is possible to penetrate and destroy the softer and more pliable plastic material layers with which the fasteners are being assembled, thereby destroying the assembly and resulting in unusable products.

OBJECTS AND SUMMARY OF THE INVENTION

It is, therefore, an object of this invention to provide a method of mounting fasteners or fastener components in material layers and a construction by which such method may be carried out wherein both the method and constructions are of maximum simplification requiring a minimum of assembly and manufacturing operations. According to the present invention, the material layers are formed of stretchable material and are preformed with determined size fastener holes therethrough particularly relating to the unique fasteners or fastener components to be assembled therewith. The fasteners or fastener components have recesses formed peripherally about shanks thereof, the shanks and the shank recesses being particularly proportioned relative to the material layer holes and material layer stretchability so that the fastener shanks may be inserted through the material layer holes while stretching said material, with the material ultimately being received in the fastener shank recesses and returning to normal size from said stretching, the material thereby engaging the fastener shanks and retaining the fasteners in assembly.

It is a further object of this invention to provide a method and construction of the foregoing general characteristics wherein a secure and satisfactory material layer and fastener assembly may be provided, yet it is unnecessary to deform the fasteners or fastener components during such assembly as has been prevalent with the prior constructions. As pointed out above, the only deformation which takes place during the material layer and fastener assembly operations is the determined stretching of the material layer in order to permit insertion of the fastener shank therein. After the fastener shank has been fully inserted, the material layer is aligned with and received in the shank recess, returning to size within said recess and retaining the fastener assembled with the material layer.

It is also an object of this invention to provide a method and construction of the foregoing general characteristics wherein both the material layer or layers and the fasteners or fastener components may be formed of plastic. The material layer or layers may be formed of any one of a large number of appropriate stretchable plastics, said layers being single ply or multi ply as conditions dictate, and the fasteners or fastener components may likewise be formed from any one of a large group of appropriate plastics and may be produced on a mass production basis by usual injection molding processes. The over-all result is that great cost reductions may be appreciated while having relatively soft, pliable and durable material plies desirable in forming object and personnel identification members, while at the same time, having fasteners or fastener components of minimum size and bulkiness, as well as equally durable in use.

It is an additional object of this invention to provide a method and construction having the foregoing general characteristics and clear advantages which is adaptable for use in constructing a wide variety of material layer products and a wide variety of fasteners or fastener components therefor, and quickly and simply assembling the same. In view of the fact that the material layer and fastener assembly operation is of such a simple form and not requiring complicated manipulation of either the material layer or fastener, the ultimate product to be formed from the material layer or layers and the assembled fasteners or fastener components is not limited in form by the required fastener assembling operation. Thus, the method and construction of the present invention lends wide versatility to the choice of product to which the same will be applied.

Other objects and advantages of the invention will be apparent from the following specification and the accompanying drawings which are for the purpose of illustration only.

BRIEF DESCRIPTION OF THE DRAWING

FIG. 1 is a perspective view of an illustrative embodiment incorporating the principles of the present invention wherein an identification tag holder has shank connectible fastener components assembled with a fastening strap of said tag holder, prior to the fastening strap being folded over for selective connection of the fastener components;

FIG. 2 is a view similar to FIG. 1, but with the fastening strap folded over and the fastener components connected;

FIG. 3 is an enlarged, fragmentary, sectional view looking in the direction of the arrows 3—3 in FIG. 1;

FIG. 4 is an enlarged, fragmentary, sectional view looking in the direction of the arrows 4—4 in FIG. 2;

FIG. 5 is a sectional view taken from the left hand side of FIG. 3, but showing the male fastener component intermediate assembly with the material layer ply; and FIG. 6 is a view similar to FIG. 5, but showing the female fastener component at the right hand side of FIG. 3 intermediate assembly thereof with the material layer ply.

DESCRIPTION OF THE BEST EMBODIMENT CONTEMPLATED

Referring to FIGS. 1 and 3 of the drawings, the principles of the present invention are illustrated in conjunction with an identification tag holder generally indicated at 10 having a tag receiving portion 12 and an integral fastening strap 14. The entire identification tag holder may be and is formed of a single layer of multiple ply plastic of any usual moderately stretchable plastic, the tag receiving portion 12 being required to be of multiple ply for permitting insertion of an identification bearing tag (not shown) therein the usual manner, although the fastening strap 14 could be of single ply and is only multiple ply for convenience in manufacture. In any event, the fastening strap 14 constitutes a stretchable material layer, being formed of the stretchable plastic as described, and where the term "layer" is used herein, it is intended to mean both solid single layers and multiple ply layers since such distinction is not of importance to the principles of the present invention.

Determined size and space fastener holes 16 and 18 are formed through the fastening strap 14 of the tag holder 10, the fastener holes 16 being smaller and receiving a smaller shank 20 of a male fastener component 22 therein, and the fastener hole 18 being larger and receiving a larger shank 24 of a female fastener component 26 therein. The male fastener component 22 includes an enlarged head 28 integral with the shank 20 and positioned underlying and abutting the lower side 30 of the fastening strap 14, the female fastener component 26 including a similar enlarged head 32 similarly positioned abutting the fastening strap lower side 30. Both of the male and female fastener components 22 and 26 are most preferably injection molded from a usual plastic, such as one of the acetal thermoplastic resin plastics, and both of the shank 20 and head 28 of the fastener component 22 are cylindrical, as are the shank 24 and head 32 of the fastener component 26.

As best seen in FIG. 3, the shank 20 of the male fastener component 22 is formed with an annular recess 34 axially adjacent the head 28 and peripherally about said shank, said annular recess having a minimum dimension not substantially greater than and preferably the same as the fastening strap fastener hole 16 and with said fastener hole preferably being round. An annular recess 36 is similarly formed and positioned in the shank 24 of the female fastener component 26 with said annular recess 36 having the same relationship to its respective fastening strap fastener hole 18 and with the fastener hole 18 also preferably being round. The shanks 20 and 24 of the male and female fastener components 22 and 26 are sized spaced smaller than their respective component enlarged heads 28 and 32, and measured amounts larger than their respective fastener holes 16 and 18 of the fastening strap 14, the fastening strap 14 engaging in the annular recesses 34 and 36 retaining the male and female fastener components 22 and 26 assembled with said fastening strap as described.

More specifically and important to the present invention, the shanks 20 and 24 and the annular recesses 34 and 36 thereof are proportioned relative to the fastening strap fastener holes 16 and 18 and the stretchability or stretching qualities of the fastening strap 14 so that, in each case, the particular fastener component shank may be inserted through its respective fastener hole causing stretching of the fastening strap material thereover during such insertion and until the fastening strap is aligned with the respective shank annular recess, at which time, the fastening strap returns to normal from such stretching and engages in the particular annular recess preferably closely surrounding the fastener component within said recess so as to engageably retain the fastener components in assembly as shown in FIGS. 1 and 3. In FIG. 5, the shank 20 of the male fastener component 22 is shown intermediate projection or insertion through the fastener hole 16 with the material of the fastening strap 14 stretching thereover to permit such insertion. FIG. 6 shows the similar intermediate insertion of the shank 24 of the female fastener component 26 through the fastener hole 18 of the fastening strap 14, the same stretching action taking place.

The shank 20 of the male fastener component 22 may have a split end 38 and a particularly formed and located connection slot 40, and the shank 24 of the female fastener component 26 may have a particularly formed connection opening 42 therethrough. Thus, the fastening strap 14 may be folded over as shown in FIG. 2 with portions of the previously upper side 44 facing and the shanks 20 and 24 of the shank connectible male and female fastener components 22 and 26 aligned, after which, the male fastener component shank 20 may be received within the connection opening 42 of the female fastener component shank 24, during which a connection edge 46 of the female fastener component shank 24 engages in the connection slot 40 of the male fastener component shank 20 as shown in FIG. 4, to thereby retain the fastener components together. In this manner, the fastening strap 14 may be fastener secured about an object (not shown) for securing the identification tag holder 10 thereto.

It is pointed out that although the embodiment illustrated and described for disclosing the principles of the present invention includes male and female fastener components 22 and 26 having cylindrical shanks 20 and 24 and cylindrical heads 28 and 32, it is not intended to limit the broader principles of the present invention to these illustrated shapes alone, but rather many other geometrical cross-sectional shapes could be used while still carrying out the principles herein involved, for instance, square, rectangular, hexagonal, and many other such shapes. The shapes of the fastener holes 16 and 18 in the stretchable material would, of course, correspond to the cross-sectional shapes of the male and female components 22 and 26. Furthermore, the use of the term "annular" to describe the male and female recesses 34 and 36 is intended in its broader sense as meaning "ring-like" or "peripheral" and is not limited to circularly annular recesses as used in the specification and appended claims.

Still further, it can readily be appreciated by one skilled in the art that the broader principles of the present invention are applicable to many forms of fasteners in many forms of products and it is not intended to limit the method and construction principles to the particular identification tag holder 10 shown.

According to the present invention, therefore, a method of mounting fasteners and fastener components and a construction thereof is provided wherein the fasteners may be assembled with a material layer, such as the fastening strap 14, in an extremely simplified manner which does not require deformation of the fasteners for retaining the unique and secure assembly thereof. Furthermore, with such method and construction, the fasteners or fastener components may be formed of relatively economical plastics, and the material layer to which they are assembled, may be formed of a variety of materials including plastic, the prime requirement according to the present invention being some stretchability of the material layer. Still further, and included in the many advantages hereinbefore discussed, the method and construction of mounting fasteners and fastener components of the present invention is adaptable for use in assembling a wide variety of fasteners for a wide variety of uses so as to be of maximum versatility.

We claim:

1. In a method of assembling fasteners with sheet-like plastic material and the like, the steps of: forming a determined size circular hole through a layer of stretchable plastic material; forming a first fastener component having an enlarged head spaced larger than said plastic material first layer hole and a reduced cylindrical shank spaced smaller than said head and a measured amount larger than said plastic material layer hole, said first fastener component shank terminating in a free end spaced from said enlarged head; forming an annular recess peripherally about said first fastener component shank adjacent said head thereof with minimum dimensions approximately the same as said material layer hole; proportioning said first fastener component cylindrical shank relative to said plastic material layer circular hole and said plastic material layer stretchability so that said material layer will stretch without fracture until said material layer hole is sufficiently large to permit passage therethrough of said first fastener component shank and then returns substantially to original size; inserting said free end of said first fastener component shank through said material layer hole while stretching said material layer without fracture over said first fastener component shank until said material layer is aligned with said first fastener component shank recess and said material layer lies against said first fastener component enlarged head, and then permitting said material layer to return substantially to original size within said first fastener component shank recess retaining said fastener component in said material layer hole; forming a circular hole for a second fastener component through a layer of stretchable plastic material; forming a second fastener component having an enlarged head spaced larger than said hole for said second fastener component and a reduced cylindrical shank spaced smaller than said head, said second fastener component shank terminating in a free end spaced from said enlarged head; inserting said free end of said cylindrical shank of said second fastener component through said material layer hole for said second fastener component until said material layer for said second fastener component lies against said second fastener component enlarged head; and endwise fastening said first and second fastener component shanks by endwise telescoping of one of said fastener component shanks over the other of said fastener component shanks and abutting a radial end surface of said one fastener component shank generally flatwise against said material layer of said other fastener component clamping said material layer against said enlarged head of said other fastener component while trapping said material layers between said enlarged heads of said fastener components.

2. In a sheet-like plastic material and fastener assembly, the combination of: first and second layers of stretchable plastic material and the like capable of being positioned with sides thereof facing and other sides non-facing, said material layers having alignable circular fastener holes formed therethrough of determined sizes; two endwise shank connectable fasteners each having an enlarged head spaced larger than a respective of said material layer hole and a reduced cylindrical shank spaced smaller than said head, at least certain of said first and second fastener shanks being a measured amount larger than said respective of said material layer holes, there being an annular recess peripherally about said shanks of said certain of said first and second fasteners adjacent said enlarged heads thereof having a minimum recessed dimension approximately the same as said respective material layer holes; said fasteners being assembled with said respective of said material layers with said fastener heads against said material layer non-facing sides and said fastener shanks extending through said respective material layer fastener holes projecting from said material layer facing sides, said material layers of said certain of said first and second fasteners being received in said fastener shank recesses, the stretching quality of said recess received material layers and the dimensioning of said respective fastener shanks and recesses of said certain fasteners relative to said respective material layer holes permitting the stretching reception without material layer fracture of said fastener shanks through said material layer holes and the return from said stretching of said unfractured material layers into and closely radially fitting said fastener shank recesses; and means associated with said fastener shanks for endwise connecting said shanks together with said material layer facing sides facing including said first fastener shank being endwise telescoped over said second fastener shank with a generally radial end surface of said first fastener shank abutting said second fastener material layer clamping said material layer against said second fastener enlarged head while also trapping both said first an dsecond material layers between said fastener heads.

References Cited

UNITED STATES PATENTS

| | | | |
|---|---|---|---|
| 2,610,879 | 9/1952 | Pope | 292—320 |
| 3,135,820 | 6/1964 | Hallett et al. | 24—208 |
| 3,144,694 | 8/1964 | Cross et al. | 24—213 |
| 3,213,507 | 10/1965 | Christian et al. | 24—217 |
| 3,238,586 | 3/1966 | Stoffel | 24—213 |
| 1,618,165 | 2/1927 | Boschelli | 24—208.3UX |
| 1,658,955 | 2/1928 | Waldes | 24—208 |
| 1,805,398 | 5/1931 | Helfant | 24—208X |
| 3,210,820 | 10/1965 | Humiston | 24—208.3 |
| 3,416,200 | 12/1968 | Daddona | 24—208.3 |

FOREIGN PATENTS

| | | | |
|---|---|---|---|
| 1,234,236 | 5/1960 | France | 24—16PB |

DONALD A. GRIFFIN, Primary Examiner

U.S. Cl. X.R.

40—21